United States Patent
Nomura et al.

(10) Patent No.: US 7,363,151 B2
(45) Date of Patent: Apr. 22, 2008

(54) MAP ERROR INFORMATION OBTAINING SYSTEM AND MAP ERROR INFORMATION OBTAINING METHOD

(75) Inventors: Kimihiro Nomura, Yokohama (JP); Hitoshi Araki, Hirakata (JP); Keiichi Senda, Kyoto (JP); Masato Yuda, Osaka (JP); Yoshiteru Kawasaki, Toyonaka (JP); Tadashi Yoshida, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 764 days.

(21) Appl. No.: 10/872,704

(22) Filed: Jun. 21, 2004

(65) Prior Publication Data

US 2005/0283699 A1   Dec. 22, 2005

(51) Int. Cl.
*G01C 21/30* (2006.01)
*G06F 165/00* (2006.01)

(52) U.S. Cl. ........................ 701/208; 701/35; 701/211; 340/995.14; 714/746

(58) Field of Classification Search ................ 701/208, 701/211, 35; 340/995.14, 988; 714/746; 345/582

See application file for complete search history.

(56) References Cited

U.S. PATENT DOCUMENTS 5,948,042 A * 9/1999 Heimann et al. ........... 701/208
6,154,152 A * 11/2000 Ito ............................ 340/988
6,845,319 B2 * 1/2005 Uchida ....................... 701/208
6,853,905 B2 * 2/2005 Barton ........................ 701/200
6,853,913 B2 * 2/2005 Cherveny et al. ........... 701/208

* cited by examiner

Primary Examiner—Tan Q Nguyen
(74) Attorney, Agent, or Firm—RatnerPrestia

(57) ABSTRACT

The present invention provides a map error information obtaining system which can promote the collection of the map error information as well as reduce the number of man-hours required for researching the site and verifying whether or not the collected map error information is accurate. The map error information obtaining system herein disclosed comprises a position detecting apparatus including image obtaining means for obtaining image data indicative of an actual condition of and in the vicinity of a current position, and a center apparatus, the position detecting apparatus being operative to transmit map error information including a position of the map information and image data where it is judged that there is a difference, to the center apparatus. The center apparatus is operative to correct the map information after verifying whether or not the difference in the map information is accurate using the image data. Furthermore, the center apparatus is operative to calculate an evaluation point for each of the position detecting apparatuses which have transmitted the map error information so that operators operating the position detecting apparatuses can be rewarded in accordance with their evaluation points.

3 Claims, 5 Drawing Sheets

FIG.4
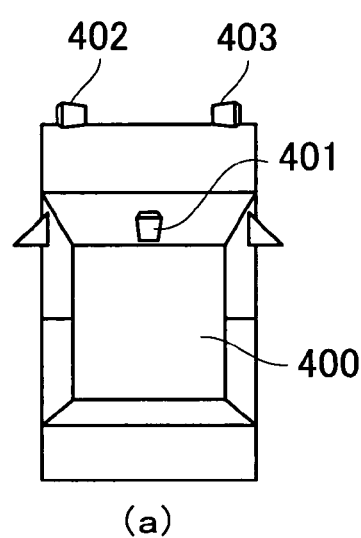
(a)
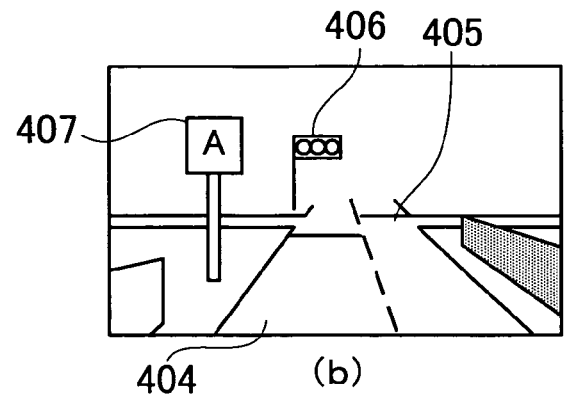
(b)
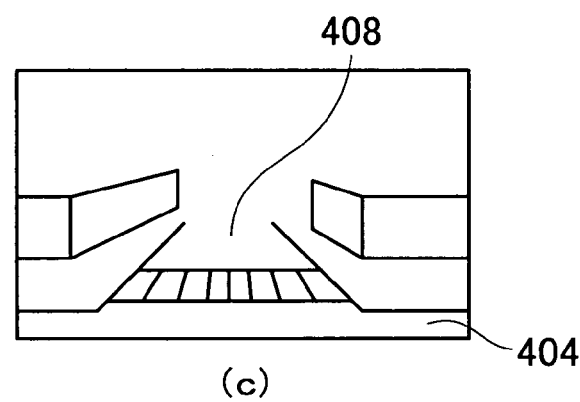
(c)
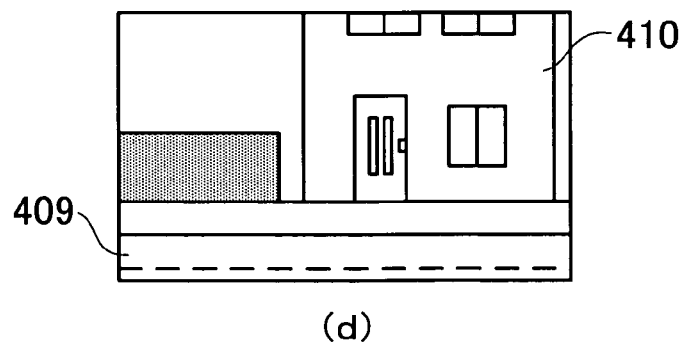
(d)
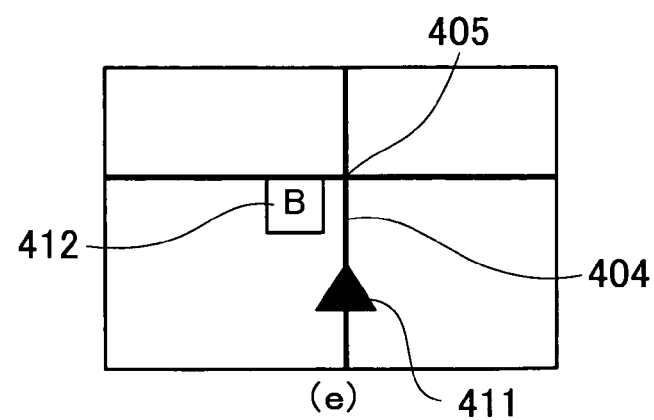
(e)

MAP ERROR INFORMATION OBTAINING SYSTEM AND MAP ERROR INFORMATION OBTAINING METHOD

BACKGROUND OF THE INVENTION

1. Field of the Invention

The present invention relates to a map error information obtaining system for and a map error information obtaining method of detecting and obtaining a difference in map information from its actual condition.

2. Description of Related Art

Up until now, there have been proposed a wide variety of map error information obtaining systems capable of detecting and obtaining a difference in map information from its actual condition. One typical example of the conventional map error information obtaining systems is disclosed in Japanese Patent Laid-Open Publication No. 2002-213966. The conventional map error information obtaining system of this type comprises a communication navigation terminal and a map database center. The communication navigation terminal comprises a current position detecting unit for detecting a current position thereof, a transmitting and receiving unit for transmitting data to and receiving data from the map database center, a storage unit for storing therein map data transmitted from the map database center, and an inputting unit for allowing an operator to input therein map data correction information to be used to correct the map data when the operator finds an error in the map data at the position detected by the current position detecting unit. The map data correction information inputted by the operator into the inputting unit is transmitted to the map database center through the transmitting and receiving unit. The map database center comprises a map database for storing therein map data indicative of map information, a map server capable of transmitting the map data to the communication navigation terminal, and a correction information storage unit for storing therein the map data correction information transmitted from the communication navigation terminal.

The conventional map error information obtaining system as previously mentioned encounters a drawback that the operators operating the communication navigation terminals are reluctant to transmit the map data correction information to the map database center resulting from the fact that operators operating the communication navigation terminals are required to bear a great burden of answering all the questions such as, for example, whether the error in the map data is related to a facility, a road, a traffic lane, a one-way traffic, or the like, audibly outputted by the communication navigation terminals one after another with almost nothing in return for such burdened efforts to be made, thereby making it difficult for the map database center to collect the map data correction information.

The conventional map error information obtaining system as previously mentioned encounters another drawback that the map data correction information tends to be inaccurate and inconsistent resulting from the fact that the map data correction information is available only in the form of audio data audibly inputted by the operator operating the inputting unit of the communication navigation terminal with his or her subjective view, and the map database center is accordingly required to dispatch personnel to research the site where the error in the map data is reported and verify whether or not the map data correction information is accurate before correcting the map data in accordance with the map data correction information received from the communication navigation terminal, thereby increasing the number of man-hours.

The present invention is made with a view to overcoming the aforementioned drawbacks.

It is a primary object of the present invention to provide a map error information obtaining system and a map error information obtaining method which can reward an operator reporting map error information indicative of an error in map information in return for the report, as well as promote the collection of the map error information.

It is a secondary object of the present invention to provide a map error information obtaining system and a map error information obtaining method which can eliminate the needs of researching the site and verifying whether or not the map error information is accurate, thereby reducing the number of man-hours.

SUMMARY OF THE INVENTION

In accordance with a first aspect of the present invention, there is provided a map error information obtaining system, comprising: a position detecting apparatus mounted on a movable object; and a center apparatus having map information stored therein and operative to collect map error information indicative of an error in the map information, the position detecting apparatus comprising: map information storing means for storing the map information therein; current position detecting means for detecting a current position; map error information generating means for judging whether or not there is a difference between the map information of and in the vicinity of the current position and an actual condition of and in the vicinity of the current position, and generating the map error information including at least the position of the map information and the difference when it is judged that there is a difference; and map error information outputting means for outputting the map error information generated by the map error information generating means, the center apparatus comprising: map error information inputting means for inputting the map error information outputted from the map error information outputting means of the position detecting apparatus; evaluation point calculating means for calculating an evaluation point on the basis of the map error information inputted by the map error information inputting means; and evaluation point managing means for having stored therein the evaluation point in association with the position detecting apparatus.

This construction makes it possible for personnel of the center apparatus to provide an operator operating the position detecting apparatus with rewards in accordance with the evaluation point, and accordingly promote the collection of the map error information with the incentive rewards because of the fact that the position detecting apparatus is operative to transmit the map error information including the position of the map information where it is judged that there is a difference, and the center apparatus is operative to store therein the evaluation point calculated on the basis of the map error information, in association with the position detecting apparatus, which has transmitted the map error information.

In the map error information obtaining system according to the present invention, a reward for an operator operating the position detecting apparatus is determined in view of the evaluation point.

This construction can satisfy the operator who has transmitted the map error information and accordingly promote the collection of the map error information because of the fact that personnel of the center apparatus can provide an operator operating the position detecting apparatus with rewards in return for the map error information.

In the map error information obtaining system according to the present invention, the center apparatus may further comprise evaluation point transmitting means for transmitting the evaluation point calculated by the evaluation point calculating means to the position detecting apparatus, and the position detecting apparatus may further comprise evaluation point receiving means for receiving the evaluation point transmitted by the evaluation point transmitting means of the center apparatus, and evaluation point storing means for storing the evaluation point received by the evaluation point receiving means.

This construction makes it easier for the operator to know his or her evaluation point, and accordingly promote the collection of the map error information because of the fact that the center apparatus can transmit the evaluation point calculated in accordance with the map error information to the position detecting apparatus which has transmitted the map error information.

In accordance with a second aspect of the present invention, there is provided a position detecting apparatus, comprising: map information storing means for storing map information therein; image obtaining means for obtaining image data indicative of an actual condition of and in the vicinity of the current position, map error information generating means for judging whether or not there is a difference between the map information of and in the vicinity of the current position and an actual condition of and in the vicinity of the current position by comparing the map information with the image data of and in the vicinity of the current position, and generating the map error information including at least the position of the map information, the difference, and the image data indicative of an actual condition of and in the vicinity of the position when it is judged that there is a difference; and map error information outputting means for outputting the map error information generated by the map error information generating means.

This construction can reduce the need of dispatching personnel to research the site where the error in the map information is reported, thereby enabling to decrease the number of man-hours required for the researching and verifying operations because of the fact that the position detecting apparatus can transmit map error information including the image data indicative of an actual condition of and in the vicinity of the concerned position to the center apparatus, and the center apparatus can verify whether or not the map error information is accurate using the image data.

The position detecting apparatus according to the present invention may further comprise manual inputting means for allowing the map error information to be manually inputted therein.

This construction makes it possible for personnel of the center apparatus to verify whether or not the map error information is accurate using the image data, thereby decreasing the number of man-hours required for the researching and verifying operations because of the fact that an operator can manually input the map error information including the position of the map information and the image data of and in the vicinity of the position where the operator finds an error in the map information.

In the position detecting apparatus according to the present invention, the map error information generating means may include an automatic error detecting section for automatically judging whether or not there is a difference between the map information of and in the vicinity of the current position and an actual condition of and in the vicinity of the current position by comparing the map information with the image data, and generating the map error information when it is judged that there is a difference.

This construction makes it possible for the position detecting apparatus to automatically compare the map information with the image data, and generate the map error information when it is judged that there is a difference.

In the position detecting apparatus according to the present invention, the map error information generating means may be operative to generate data indicative of a traveling locus constituted by a plurality of positions and moving image data of a traveling route on the traveling locus, or data indicative of a traveling locus constituted by a plurality of positions and a plurality of pieces of image data of a traveling route on the traveling locus as the map error information when it is judged that there are a plurality of differences at the positions along the traveling route.

This construction makes it possible for the center apparatus to evaluate the map error information in more detail because of the fact that map error information includes the data indicative of a traveling locus constituted by a plurality of positions and moving image data of a traveling route on the traveling locus, or data indicative of a traveling locus constituted by a plurality of positions and a plurality of pieces of image data of a traveling route on the traveling locus.

In the position detecting apparatus, the map error information outputting means may be operative to output the map error information to a center apparatus by way of telecommunication.

This construction makes it possible for the position detecting apparatus to promptly transmit the map error information to the center apparatus.

In the position detecting apparatus according to the present invention, the map error information outputting means may further include a removable storage medium capable of having the map error information stored therein.

This construction makes it possible for the position detecting apparatus to output the map error information to the center apparatus at low cost without having communication means mounted thereon because of the fact that the removable storage medium having the map error information stored therein can be removed from the position detecting apparatus and delivered to the center apparatus.

In accordance with a third aspect of the present invention, there is provided a center apparatus, comprising: map error information inputting means for inputting map error information outputted from a position detecting apparatus mounted on a movable object; evaluation point calculating means for calculating an evaluation point on the basis of the map error information inputted by the map error information inputting means; and evaluation point managing means for having stored therein the evaluation point in association with the position detecting apparatus.

This construction makes it possible for the center apparatus to calculate the evaluation point for each of the position detecting apparatuses on the basis of the map error information.

In accordance with a fourth aspect of the present invention, there is provided a map error information obtaining method, comprising the steps of: (a) preparing a position detecting apparatus including: map information storing means for storing map information therein; current position detecting means for detecting a current position; map error information generating means for judging whether or not there is a difference between the map information of and in the vicinity of the current position and an actual condition of and in the vicinity of the current position, and generating the map error information including at least the position of the map information and the difference when it is judged that there is a difference; and map error information outputting means for outputting the map error information generated by the map error information generating means, and a center apparatus including: map error information inputting means for inputting the map error information outputted from the map error information outputting means of the position detecting apparatus; evaluation point calculating means for calculating an evaluation point on the basis of the map error information inputted by the map error information inputting means; and evaluation point managing means for having stored therein the evaluation point in association with the position detecting apparatus; (b) detecting a current position, by the current position detecting means of the position detecting apparatus; (b) judging whether or not there is a difference between the map information of and in the vicinity of the current position and an actual condition of and in the vicinity of the current position, by the map error information generating means; (c) generating the map error information including at least the position of the map information and the difference when it is judged that there is a difference, by the map error information generating means; (d) outputting the map error information to have the center apparatus the map error information inputted therein, by the map error information outputting means of the position detecting apparatus and the map error information inputting means of the center apparatus; (e) calculating an evaluation point on the basis of the map error information, by the evaluation point calculating means; and (f) having stored therein the evaluation point in association with the position detecting apparatus, by the evaluation point managing means.

This construction makes it possible for personnel of the center apparatus to provide an operator operating the position detecting apparatus with rewards in accordance with the evaluation point, and accordingly promote the collection of the map error information with the incentive rewards because of the fact that the position detecting apparatus is operative to transmit the map error information including the position of the map information where it is judged that there is a difference, and the center apparatus is operative to store therein the evaluation point calculated on the basis of the map error information, in association with the position detecting apparatus, which has transmitted the map error information.

In the map error information obtaining method according to the present invention, the evaluation point may be calculated in view of the other map error information received by said center apparatus.

This construction makes it possible for the evaluation point to be changed in accordance with the other map error information already received by the center apparatus.

In the map error information obtaining method according to the present invention, the evaluation point may be increased for the map error information which includes the difference not stored in said center apparatus.

This construction makes it possible to assign a high evaluation point to the position detecting apparatus, which has transmitted the map error information having the difference not stored in the center apparatus, thereby enabling to provide an operator, who has transmitted new map error information, with a high reward.

In the map error information obtaining method according to the present invention, the evaluation point may be decreased for the map error information which includes the difference found in the other map error information already received by said center apparatus in accordance with the number of pieces of the already stored map error information including the same difference.

This construction makes it possible to assign a higher evaluation point to the position detecting apparatus which has transmitted the map error information earlier, thereby enabling to reward an operator who has transmitted the map error information earlier with a higher prize, and accordingly providing an incentive to promptly report the map error information to the center apparatus.

In the map error information obtaining method according to the present invention, a reward for an operator operating the position detecting apparatus is determined in view of the evaluation point stored in the evaluation point managing means.

This construction makes it possible for the center apparatus to provide an operator operating the position detecting apparatus, which has transmitted the map error information, with rewards in return.

BRIEF DESCRIPTION OF THE DRAWINGS

The features and advantages of the present invention will become apparent as the description proceeds when taken in conjunction with the accompanying drawings, in which

FIG. 4 shows examples of image data obtained by the position detecting apparatus.

DESCRIPTION OF THE PREFERRED EMBODIMENT

The preferred embodiment of the present invention will be described hereinlater with reference to the drawings.

Figure 1:
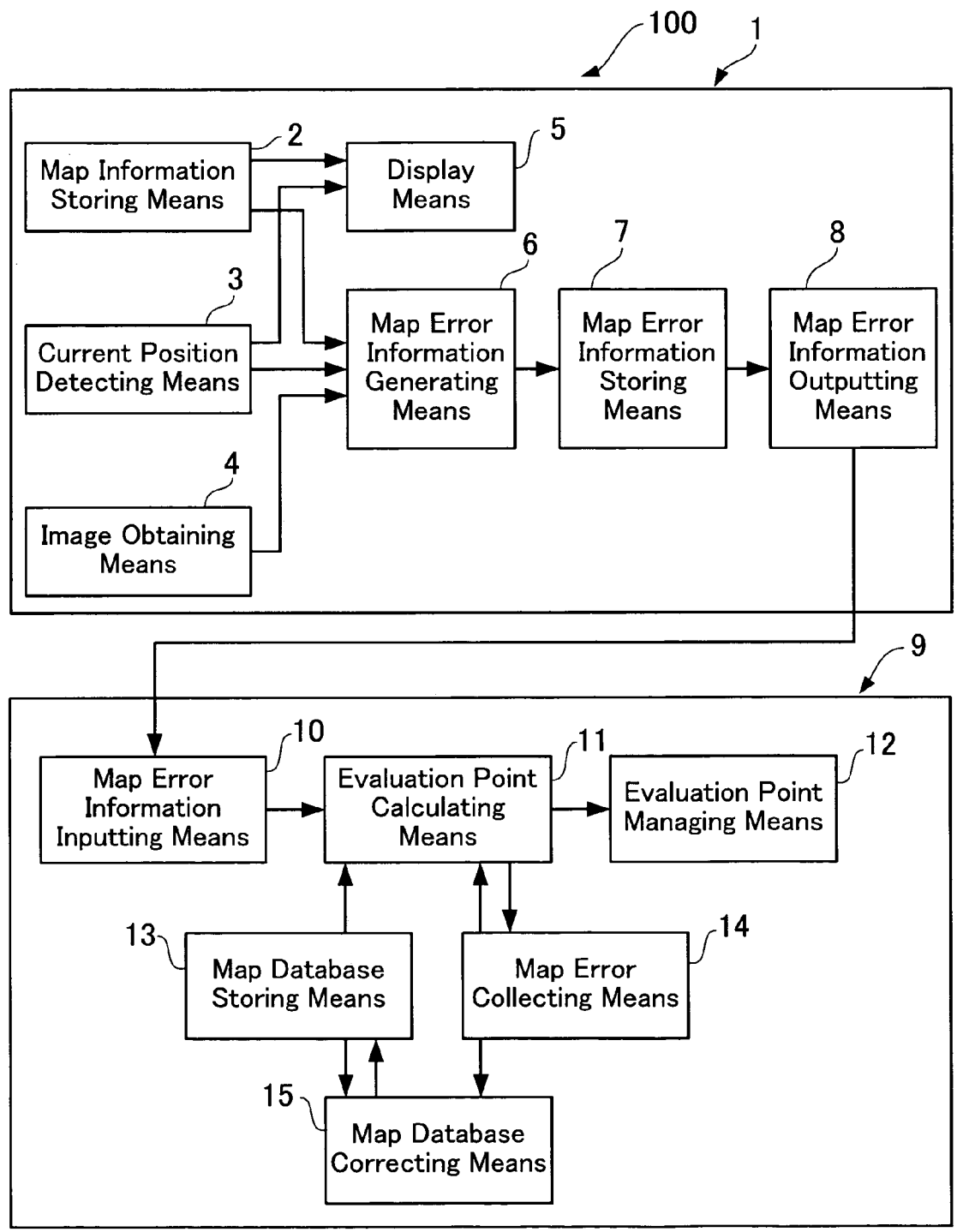
FIG. 1 is a block diagram showing a preferred embodiment of a map error information obtaining system according to the present invention.

Referring to FIG. 1 of the drawings, there is shown a map error information obtaining system 100 according to the present invention, comprising a position detecting apparatus 1 mounted on a movable object such as, for example, a vehicle, and capable of detecting a current position, and a center apparatus 9 for collecting map error information from the position detecting apparatus 1.

The position detecting apparatus 1 comprises map information storing means 2 for storing the map information therein, current position detecting means 3 for detecting a current position, image obtaining means 4 for taking a picture of and in the vicinity of the current position to obtain image data indicative of an actual condition of and in the vicinity of the current position, display means 5 for displaying the map information of and in the vicinity of the current position, map error information generating means 6 for judging whether or not there is a difference between the map information of and in the vicinity of the current position and an actual condition of and in the vicinity of the current position by comparing the map information with the image data of and in the vicinity of the current position, and generating map error information including at least the position of the map information, the difference, and the image data indicative of the actual condition of and in the vicinity of the current position when it is judged that there is a difference, map error information storing means 7 for storing therein the map error information, and map error information outputting means 8 for outputting the map error information stored in the map error information storing means 7.

The center apparatus 9 comprises map error information inputting means 10 for inputting the map error information outputted from the map error information outputting means 8 of the position detecting apparatus 1, evaluation point calculating means 11 for calculating an evaluation point on the basis of the map error information inputted by the map error information inputting means 10, and evaluation point managing means 12 for having stored therein the evaluation point, which has been calculated by the evaluation point calculating means 11 on the basis of the map error information, in association with the position detecting apparatus 1, which has transmit the same map error information. The center apparatus 9 further comprises map database storing means 13 for storing therein data indicative of detailed map information, map error collecting means 14 for collecting map error information, counting the number of pieces of the collected map error information for each point position in the map, and storing the map error information thus collected and the number of pieces of the map error information thus counted for each point position, and map database correcting means 15 for correcting the map information in accordance with the map error information stored in the map error collecting means 14.

The construction of the map error information obtaining system 100 will be described in detail hereinlater.

Firstly, the construction of the position detecting apparatus 1 will be described hereinlater.

The map information storing means 2 is adapted to store therein the map information such as, for example, information on roads, facilities, and the like. The information on roads, hereinlater referred to as "road information", includes information on longitudes and latitudes indicative of points and lines forming part of a plurality of roads, information on intersections formed by the roads crossed with each other, names of the intersections, information on width, the number of lanes, right or left turn lanes, and presence or absence of a traffic signal in each of the roads, and the like. The information on facilities, hereinlater referred to as "facility information", includes positions of parking facilities, positions of convenience stores and their business affiliations, positions of filling stations and their business affiliations, positions of restaurants and their business affiliations, and the like. The map information storing means 2 is constituted by an optical memory disk such as, for example, DVD (Digital Versatile Disc) or CD (Compact Disc), a hard disk, a semiconductor memory, or the like. The map information storing means 2 may have stored therein the map information in advance. The map information storing means 2 is adapted to receive the latest map information from the center apparatus 9 by way of telecommunication as required.

The current position detecting means 3 is designed to detect a current position. The current position detecting means 3 is adapted to obtain the current position with reference to position information calculated on the basis of signals transmitted from the GPS (Global Positioning System) satellites, position information calculated using a vehicle speed sensor and a gyro sensor, position information received through a mobile phone or a PHS (Personal Handyphone System) base station, and/or any combination thereof.

The image obtaining means 4 is constituted by a camera unit, or the like, and designed to take a picture of and in the vicinity of the current position detected by the current position detecting means 3 to obtain image data indicative of an actual condition of and in the vicinity of the current position. In the case that the position detecting apparatus is mounted on a vehicle to take pictures in front of and on the sides of the vehicle, the image obtaining means 4 is constituted by, for example, CCD (charge-coupled device) camera units respectively installed on the front and side portions of the vehicle. The image obtaining means 4 includes a wide-angle lens so as to take a picture representative of an actual condition in a range as wide as possible. The image obtaining means 4 may take a plurality of pictures at predetermined intervals (or a moving picture), or take a picture at an arbitrary position as required.

The display means 5 is constituted by a CRT (cathode-ray tube) display or a LCD (liquid crystal display), and adapted to display map information and a current position thereof after reading the map information of and in the vicinity of the current position from the map information storing means 2 on the basis of the current position detected by the current position detecting means 3.

The map error information generating means 6 includes an automatic error detecting section for automatically judging whether or not there is a difference between map information of and in the vicinity of the current position and an actual condition of and in the vicinity of the current position by comparing the map information with the image data obtained by the image obtaining means 4 after reading the map information of and in the vicinity of the current position from the map information storing means 2 on the basis of the current position detected by the current position detecting means 3. The automatic error detecting section is adapted to generate the map error information including the image data, the current position, and the result of the judgment indicating the difference when it is judged that there is a difference.

The map error information generating means 6 is designed to detect a difference between the map information and its actual condition, i.e., an error in the map information with respect to the road information such as, for example, presence or absence of each of roads, names of intersections, and difference of width, the number of lanes, starting positions of right or left turn lanes, and presence or absence of each of the traffic signals, positions of tunnels, and crossing with an overpass or underpass in each of the roads, and the facility information such as, for example, positions of parking facilities, convenience stores, filling stations, and restaurants, and their business affiliations, and positions of railroad crossings, road bridges, and pedestrian bridges. The position of the map information to be included in the map error information is herein referred to as "position where it is judged that there is a difference", and constituted by either the current position detected by the current position detecting means 3 when it is judged that there is a difference or the position on the map information indicative of the current position when it is judged that there is a difference.

The map error information storing means 7 is adapted to store therein the map error information generated by the map error information generating means 6. When the difference included in the map error information to be stored is found in the other map error information already stored in the map error information storing means 7, the map error information storing means 7 may discard the latest map error information or replace the map error information already stored with the latest map error information.

The map error information outputting means 8 is adapted to output the map error information stored in the map error information storing means 7 to the center apparatus 9, which is operative to correct the map information. The map error information outputting means 8 is operative to output the map error information to the center apparatus 9 by way of telecommunication including wireless communication using, for example, a mobile phone, a PHS, wireless LAN, Internet and connecting means for connecting therebetween. In addition, the map error information may be transferred from the position detecting apparatus 1 to the center apparatus 9 by way of a storage medium. In this case, the map error information outputting means 8 may include a removable storage medium capable of having the map error information stored therein and to be physically transferred from the position detecting apparatus 1 to the center apparatus 9. The removable storage medium includes a portable semiconductor memory such as, for example, SD (secure digital) card, Smart Media, and Multimedia card, medium storage means such as, for example, CD-R (compact disc recordable), DVD-RAM (digital versatile disc random access memory), and the like, and is readable by the center apparatus 9.

Then, the construction of the center apparatus 9 will be described hereinlater.

The map error information inputting means 10 is adapted to input the map error information outputted from the map error information outputting means 8 of the position detecting apparatus 1. As described earlier, the map error information includes the image data and the position where it is judged that there is a difference. The map error information inputting means 10 is operative to input the map error information by way of, for example, telecommunication including wireless communication using, for example, a mobile phone, a PHS, wireless LAN, Internet and connecting means for connecting therebetween. In addition, the map error information inputting means 10 may receive the removable storage medium from the position detecting apparatus 1 and read the map error information stored in the removable storage medium. The removable storage medium includes a portable semiconductor memory such as, for example, SD (secure digital) card, Smart Media, and Multimedia card, medium storage means such as, for example, CD-R (compact disc recordable), DVD-RAM (digital versatile disc random access memory), and the like.

The evaluation point calculating means 11 is adapted to calculate an evaluation point on the basis of the map error information inputted by the map error information inputting means 10. The evaluation point is referred to when a reward for an operator is determined in return for the map error information which he or she has reported. The evaluation point calculating means 11 is operative to calculate a base evaluation point of, for example, five for the map error information when it is judged that there is a difference in the map information stored in the map database storing means 13 after comparing the map error information and the map information stored in the map database storing means 13. The evaluation point calculating means 11 is then operative to judge whether or not the difference included in the current map error information is found in the other map error information already received from the other position detecting apparatus 1 and stored in the map error collecting means 14, and count the number of pieces of the other already received map error information which include the same difference when it is judged that the difference included in the current map error information is found in the other map error information. The evaluation point to be calculated for the map error information which includes the difference found in the other map error information already received by the center apparatus 9 is decreased substantially in proportion to the number of pieces of the already stored map error information including the same difference.

This means that the evaluation point calculating means 11 is operative to calculate an additional evaluation point of, for example, thirty, for the map error information which is firstly received, i.e., includes the difference not stored in the map error collecting means 14. The evaluation point calculating means 11 is, on the other hand, operative to calculate an additional evaluation point of, for example, fifteen for the secondly received map error information which includes the same difference. Similarly, the evaluation point calculating means 11 is operative to calculate an additional evaluation point of, for example, eight for the thirdly received map error information which includes the same difference. The evaluation point, i.e., the total of the base calculation point and the additional calculation point thus calculated is then assigned to each of the respective position detecting apparatuses 1 which have transmitted the corresponding map error information. In addition, the evaluation point calculating means 11 is designed to allow an operator to modify the map error information and the number of pieces of the map error information stored in the map error collecting means 14.

The evaluation point managing means 12 is adapted to have stored therein the evaluation points calculated by the evaluation point calculating means 11, in association with the respective position detecting apparatuses 1. This means that the evaluation point management means 12 is designed to have stored therein the total of the evaluation points cumulatively calculated by the evaluation point calculating means 11 for the time period of, for example, every one month or for every one year, in association with each of the respective position detecting apparatuses 1. In return for the report, the operators operating the position detecting apparatuses 1 scoring high evaluation points may be made public on the Internet on a monthly basis. In addition, the operators scoring high evaluation points on an annual basis may receive as rewards discounts when purchasing, for example, a new map in the form of data stored in a storage medium or to be downloaded through the Internet. As will be seen from the foregoing description, it is to be understood that in the map error information obtaining system 100 thus constructed can provide the operators with incentives to report the map error information, thereby enabling to promote the collection of the map error information.

The map database storing means 13 is constituted by a large-capacity rewritable storage device such as, for example, a hard disk, and adapted to store therein map information identical to the one stored in the map information storing means 2 of the position detecting apparatus 1. The map database storing means 13 is operative to transmit the map information of and in the vicinity of the concerned position to the evaluation point calculating means 11 when the evaluation point calculating means 11 compares the map error information and the map information of and in the vicinity of the concerned position to judge whether or not there is an error in the map information of and in the vicinity of the concerned position. The map database storing means 13 is operative to transmit the map information to the map database correcting means 15 when the map database correcting means 15 corrects the map information, and receive the corrected map information from the map database correcting means 15 to have the map information updated with the latest map information. In addition, the map database storing means 13 is operative to transmit the updated map information of and in the vicinity of the concerned position to the position detecting apparatus 1 in response to a request from the map information storing means 2 of the position detecting apparatus 1 by way of telecommunication.

The map error collecting means 14 is adapted to collect map error information, which has been so far transmitted to the center apparatus 9, count the number of pieces of the collected map error information for each point position in the map information, and store therein the map error information thus collected and the number of pieces of the map error information thus counted for each of point positions. The map error collecting means 14 is constituted by a storage device such as, for example, a hard disk, an S-RAM (static random access memory), or the like. The map error collecting means 14 is operative to store therein the map error information when the evaluation point calculating means 11 transfers map error information which is firstly received and includes a difference not stored in the map error collecting means 14, and set a counter value at "1" in its register. The map error collecting means 14 is operative to increment the counter value by "1" when the map error collecting means 14 receives from the evaluation point calculating means 11 the map error information which includes the same difference already stored therein. The map error collecting means 14 may discard the latest map error information or replace the map error information already stored with the latest map error information. Alternatively, the map error collecting means 14 may compare the latest map error information with the map error information already stored and select one from them to be stored therein.

The map database correcting means 15 is adapted to correct the map information stored in the map database storing means 13 in accordance with the map error information stored in the map error collecting means 14. The map database correcting means 15 is operative to read map information of and in the vicinity of a point position from the map error information stored in the map error collecting means 14, and detect a difference between the map information of and in the vicinity of the point position and an actual condition of and in the vicinity of the point position in the same manner performed by the map error information generating means 6 as described earlier. When, for example, it is judged that a new road is present in the image data of the map error information while, on the other hand, the road is not present in the map information, the map database correcting means 15 is operative to extract the road information such as, for example, a position, a width, the number of lanes, a shape, and the like on the new road, from the image data, add the road information on the new road to the map information, and have the map database storing means 13 update the map information.

Figure 2:
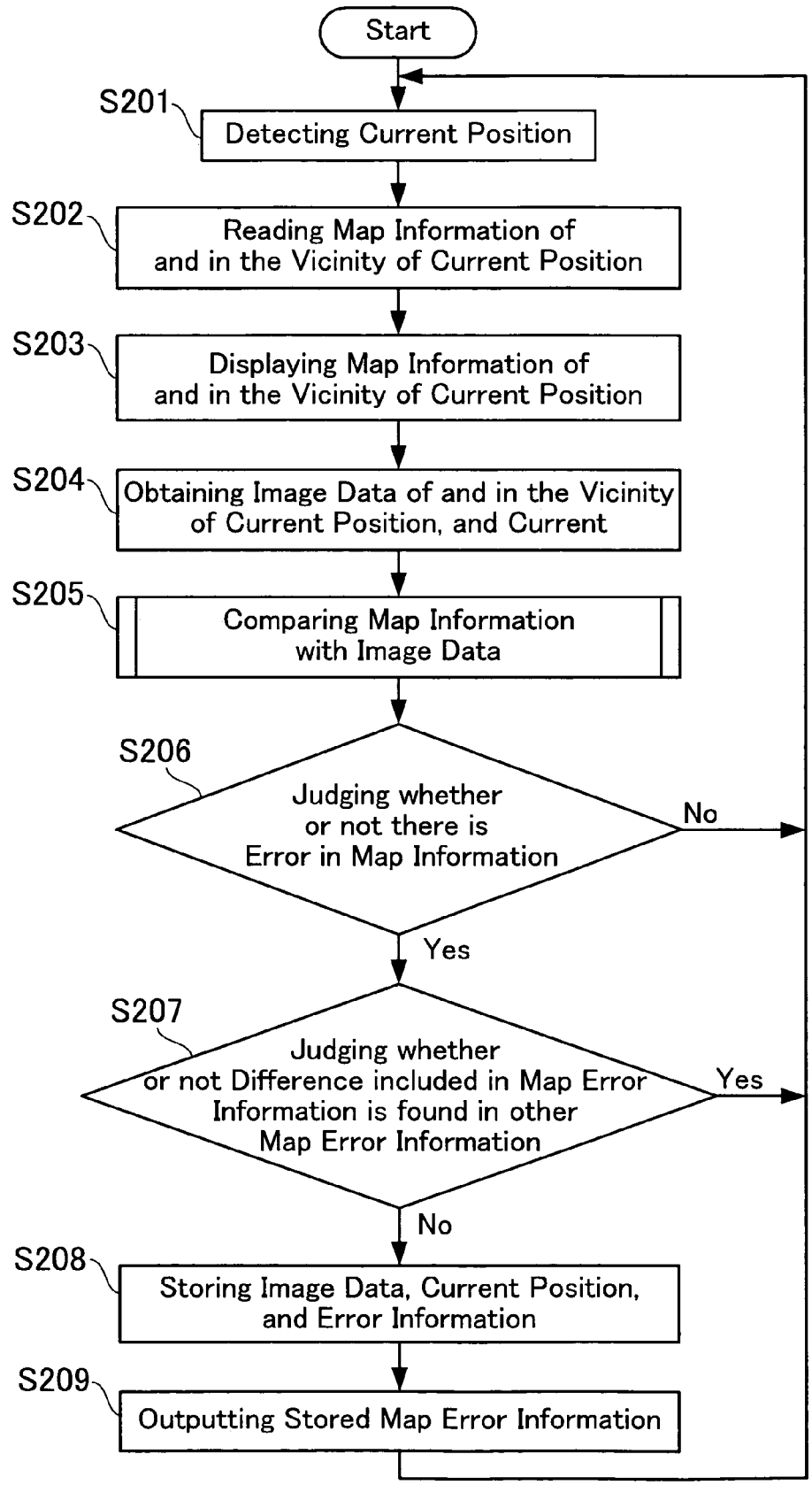
FIG. 2 is a flowchart showing an operation of a position detecting apparatus.

The operation of the position detecting apparatus 1 will be described hereinafter with reference to the flowchart shown in FIG. 2.

In the step S201, the current position detecting means 3 is operated to detect a current position of a movable object having the position detecting apparatus 1 mounted thereon. The step S201 goes forward to the step S202, in which the display means 5 is operated to read map information of and in the vicinity of the current position from the map information storing means 2. The step S202 goes forward to the step S203, in which the display means 5 is operated to display the map information of and in the vicinity of the current position, and the current position.

The step S203 goes forward to the step S204, in which the image obtaining means 4 is operated to take a picture of and in the vicinity of the current position of the movable object having the position detecting apparatus 1 mounted thereon to obtain image data indicative of an actual condition of and in the vicinity of the current position.

The step S204 goes forward to the step S205, in which the map error information generating means 6 is operated to compare the map information with the image data of and in the vicinity of the current position. The step S205 goes forward to the step S206, in which the map error information generating means 6 is operated to judge whether or not there is an error in the map information, i.e., a difference between the map information of and in the vicinity of the current position and an actual condition of and in the vicinity of the current position on the basis of a result of the comparison made in the step S205. When it is judged in the step S206 that there is no error in the map information, the step S206 goes back to the step S201. When, on the other hand, it is judged that there is an error in the map information, the map error information generating means 6 is operated to generate map error information including at least the position of the map information, the difference, and the image data indicative of the actual condition of and in the vicinity of the position where it is judged that there is a difference, and the step S206 goes forward to the step S207.

In the step S207, the map error information storing means 7 is operated to judge whether or not the difference included in the map error information is found in the other map error information already stored in the map error information storing means 7. When it is judged in the step S207 that the difference included in the map error information is found in the other map error information already stored in the map error information storing means 7, the step S207 goes back to the step S201. When, on the other hand, it is judged in the step S207 that the difference included in the map error information is not found in the other map error information already stored in the map error information storing means 7, the step S207 goes forward to the step S208, in which the map error information storing means 7 is operated to store therein the map error information including the position, the image data, and the error information, i.e., the difference. The step S208 goes forward to the step S209, in which the map error information outputting means 8 is operated to output the map error information to, for example, the center apparatus 9 by way of telecommunication.

Figure 3:
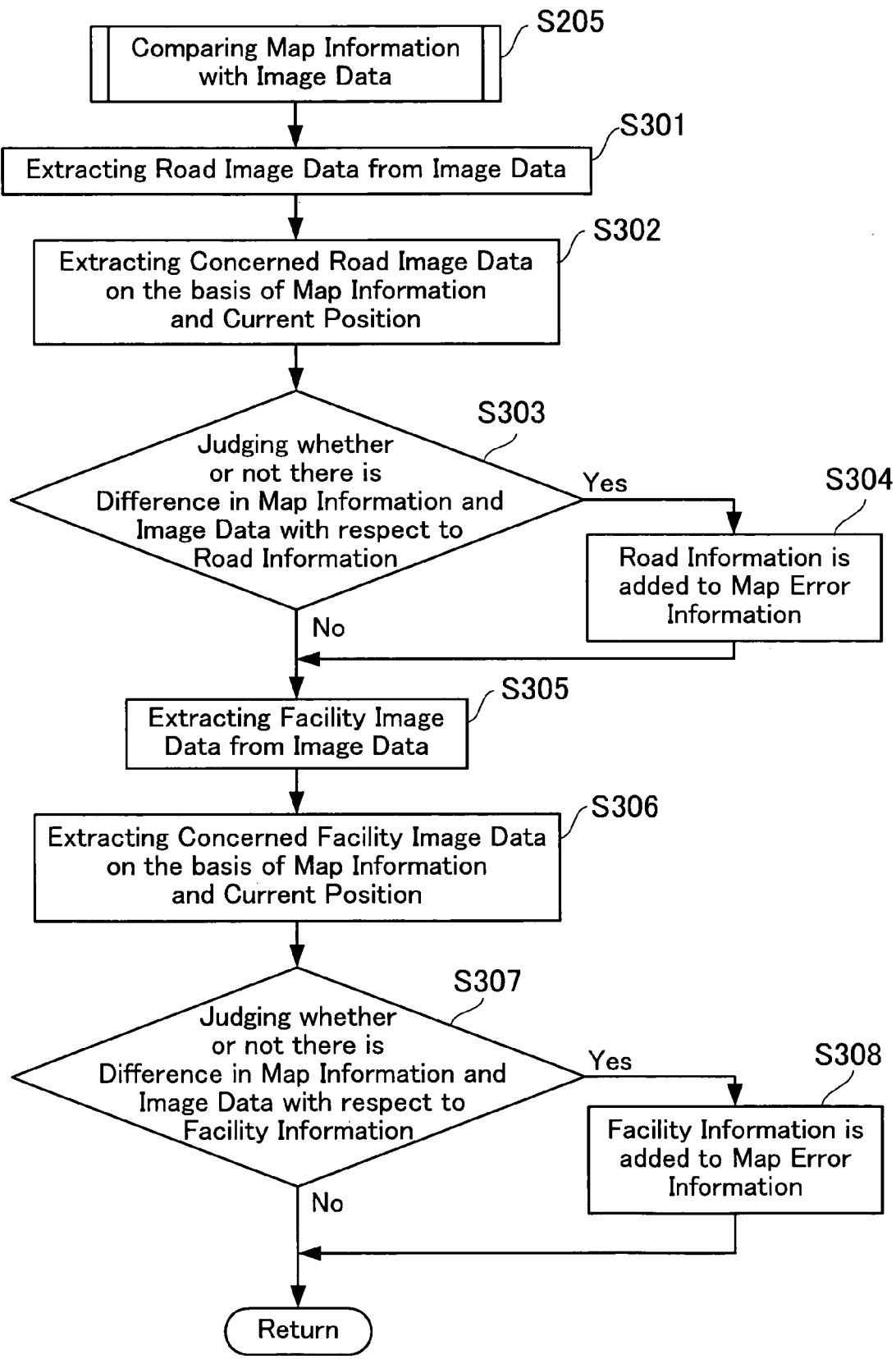
FIG. 3 is a flowchart showing an operation of map error information generating means forming part of the position detecting apparatus.

The operation of the map error information generating means 6 forming part of the position detecting apparatus 1 appearing in the step S205 will be described in detail hereinafter with reference to a flowchart shown in FIG. 3.

In the step S301, the image data related to the road information, hereinafter referred to as "road image data", is extracted from the image data obtained by the image obtaining means 4. The step S301 goes forward to the step S302, in which the road image data of and in the vicinity of the current position, hereinafter referred to as "concerned road image data", is extracted from the road image data on the basis of the current position detected by the current position detecting means 3 and the map information obtained from the map information storing means 2. The step S302 goes forward to the step S303, in which the road information contained in the map information is compared with the concerned road image data and it is judged whether or not there is a difference between the map information and the image data with respect to the road information such as, for example, a new road is shown in the image data while, on the other hand, no road is provided in the map information. When it is judged in the step S303 that there is a difference in the map information with respect to the road information, the step S303 goes forward to the step S304, in which the road information of the concerned road image data is temporally stored so as to be later included in map error information. The step S304 goes forward to the step S305. When it is, on the other hand, judged in the step S303 that there is no difference in the map information with respect to the road information, the step S303 goes forward to the step S305.

In the step S305, the image data related to the facility information, hereinlater referred to as "facility image data", is extracted from the image data obtained by the image obtaining means 4. The step S305 goes forward to the step S306, in which facility image data of and in the vicinity of the current position, hereinlater referred to as "concerned facility image data", is extracted from the facility image data on the basis of the current position detected by the current position detecting means 3 and the map information obtained from the map information storing means 2. The step S306 goes forward to the step S307, in which the facility information contained in the map information is compared with the concerned facility image data and it is judged whether or not there is a difference between the map information and the image data with respect to the facility information such as, for example, a new facility is shown in the image data while, on the other hand, no facility is provided in the map information or the name of the facility is wrongly recorded in the map information. When it is judged in the step S307 that there is a difference in the map information with respect to the facility information, the step S307 goes forward to the step S308, in which the facility information of the concerned facility image data is temporally stored so as to be later included in map error information. The step S308 goes forward to the step END. When it is, on the other hand, judged in the step S307 that there is no difference in the map information with respect to the facility information, the step S307 goes forward to the step END.

While it has been described in the above that the difference in the map information such as presence or absence of each of roads and facilities is judged, it is needless to mention, the other differences in the map information such as, for example, difference of road width, presence or absence of each of the traffic signals, the tunnels, and the like may be judged.

FIG. 4 illustrates examples of image data obtained by the position detecting apparatus 1 mounted on a vehicle, and displayed by the display means 5.

As shown in FIG. 4(a), the vehicle 400 is provided with, as image obtaining means 4, a front camera unit 401 for taking a picture to be viewed frontward from the vehicle 400, a left-side camera unit 402 for taking a picture to be viewed leftward from the vehicle 400 and a right-side camera unit 403 for taking a picture to be viewed rightward from the vehicle 400.

FIG. 4(b) illustrates an example of the image data obtained by the front camera unit 401. In front of the vehicle 400, there are shown a road 404 on which the vehicle 400 is traveling, an intersection 405 formed by the road 404 with another road, a traffic signal 406 installed at the intersection 405, and a signboard 407 of a shop A placed to the left short of the intersection 405.

FIG. 4(c) illustrates an example of the image data obtained by the left-side camera unit 402. There are shown a road 404 on which the vehicle 400 is traveling, and a road 408 leading up to the road 404.

FIG. 4(d) illustrates an example of the image data obtained by the right-side camera unit 403. There are shown a road 409, which is an opposite traffic lane of the road 404, and a building 410 located in the vicinity of and along the road 404.

FIG. 4(e) illustrates an example of the map information of and in the vicinity of the current position 411 shown by the display means 5 forming part of the position detecting apparatus 1. There are shown a road 404 on which the vehicle 400 is traveling, an intersection 405 formed by the road 404 with another road, and a signboard 412 of a shop B placed to the left short of the intersection 405.

From the image data shown in FIG. 4(b), it is seen that the map information and the image data of and in the vicinity of the current position is different in the facts that no traffic signal is present in the map information while, on the other hand, the traffic signal 406 is shown in the image data, and the signboard 412 of the shop B is present in the map information while, on the other hand, the signboard 407 of the shop A is shown in the image data.

From the image data shown in FIG. 4(c), it is seen that the map information and the image data of and in the vicinity of the current position is different in the fact that no road is present on the left side of the road 404 in the image information while, on the other hand, the road 408 leading up to the road 404 is shown on the left side of the road 404 in the image data.

Figure 5:
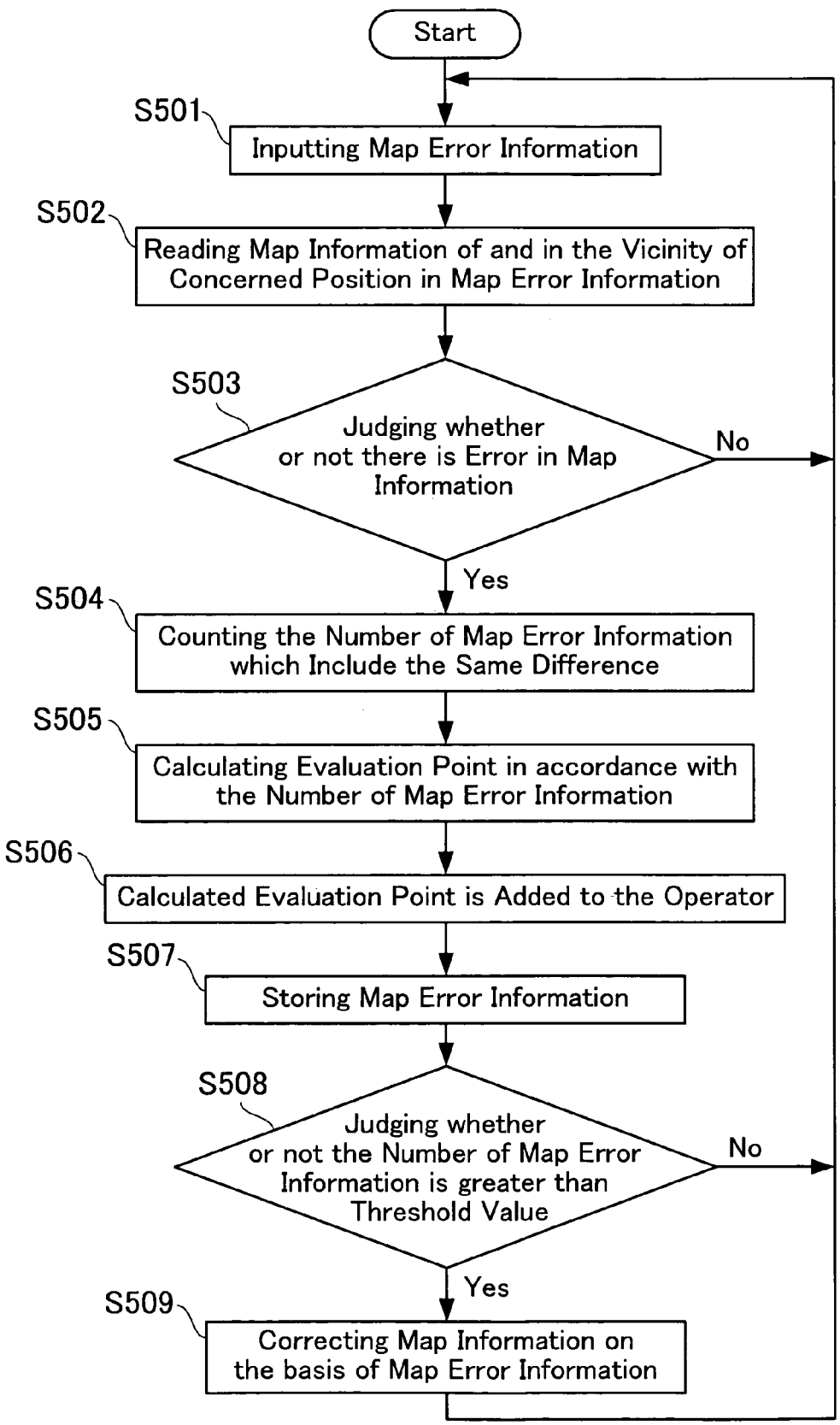
FIG. 5 is a flowchart showing an operation of a center apparatus.

The operation of the center apparatus 9 will be described hereinlater with reference to the flowchart shown in FIG. 5.

In the step S501, the map error information inputting means 10 is operated to input the map error information from the position detecting apparatus 1 by way of, for example, telecommunication or a storage medium. The step S501 goes forward to the step S502, in which the evaluation point calculating means 11 is operated to read the map information of and in the vicinity of the concerned position from the map database storing means 13 on the basis of the concerned position contained in the inputted map error information. The step S502 goes forward to the step S503, in which it is judged whether or not there is an error in the map information, i.e., a difference between the map information and its actual condition of and in the vicinity of the concerned position after comparing the inputted map error information and the map information thus read. When it is judged that the inputted map error information is false, or the map information has already been corrected, and there is, accordingly, no error in the map information, the step S503 goes back to the step S501, in which the map error information inputting means 10 is operated to input another map error information.

When it is, on the other hand, judged that there is an error in the map information, the step S503 goes forward to the step S504, in which the evaluation point calculating means 11 is operated to judge whether or not the difference included in the current map error information is found in the other map error information already received and stored in the map error collecting means 14, and count the number of pieces of the other already received map error information which include the same difference when it is judged that the difference included in the current map error information is found in the other map error information. The step S504 goes forward to the step S505, in which the evaluation point is calculated in accordance with the number of pieces of the already stored map error information including the same difference. The step S505 goes forward to the step S506, in which the thus calculated evaluation point is added to the evaluation point cumulatively stored in the evaluation point management means 12 in association with the operator (of the position detecting apparatus 1, which has transmitted the map error information). The step S506 goes forward to the step S507, in which the map error collecting means 14 is operated to count the number of pieces of the map error information for the same difference, and store the map error information and the number of pieces of the map error information thus counted for the same difference. The step S507 goes forward to the step S508.

In the step S508, the map error collecting means 14 is operated to judge whether or not the number of pieces of the map error information for the same difference is greater than a predetermined threshold value. When it is judged that the number of pieces of the map error information for the same difference is not greater than the predetermined threshold value, the step S508 goes back to the step S501. When it is, on the other hand, judged that the number of pieces of the map error information for the same difference is greater than the predetermined threshold value, the step S508 goes back to the step S509, in which the map error collecting means 14 is operated to output the map error information to the map database correcting means 15, and the map database correcting means 15 is operated to read the map error information and correct the map information of and in the vicinity of the concerned position in the map database storing means 13 in accordance with the map error information thus read, and the map database storing means 13 is operated to store therein the map information thus corrected. The step S509 goes back to the step S501.

As will be seen from the foregoing description, it is to be understood that the map error information obtaining system 100 according to the present invention, which comprises a center apparatus 9 including evaluation point calculating means 11 for calculating an evaluation point on the basis of the map error information inputted by an operator, can provide the operator, who has transmitted the map error information, with rewards such as, for example, discounts.

In addition, the map error information obtaining system 100 according to the present invention, which comprises a position detecting apparatus 1 including image obtaining means 4 for taking a picture of and in the vicinity of the current position to obtain image data indicative of an actual condition of and in the vicinity of the current position, map error information generating means 6 for judging whether or not there is a difference between the map information of and in the vicinity of the current position and an actual condition of and in the vicinity of the current position by comparing the map information with the image data of and in the vicinity of the current position, and generating map error information when it is judged that there is a difference, and map error information outputting means 8 for outputting the map error information including the image data indicative of the actual condition of and in the vicinity of the concerned position, makes it possible for the position detecting apparatus 1 to automatically judge whether or not there is a difference in the map information, as well as for the center apparatus 9 to verify whether or not the map error information is accurate using the image data, thereby reducing the number of man-hours required for the researching and verifying operations.

Though it has been described in the above that the position detecting apparatus 1 according to the present invention comprises map error information generating means 6 for automatically judging and detecting an error in the map information, the position detecting apparatus 1 may include manual inputting means for allowing an operator to judge and detect an error in the map information and manually input therein the corresponding map error information. The position detecting apparatus 1 thus constructed can report the map error information, which is difficult to be detected with the image data alone.

In addition, in the position detecting apparatus 1 according to the present invention, the map error information generating means 6 may generate data indicative of a traveling locus constituted by a plurality of positions and moving image data of a traveling route on the traveling locus, or data indicative of a traveling route constituted by a plurality of positions and a plurality of pieces of image data of a traveling route on the traveling locus as the map error information when it is judged that there are a plurality of differences at the positions along the traveling route of, for example, 10 meters. The traveling route included in the map error information thus generated can be easily recognized as a whole, thereby making it easier for the center apparatus to correct the map information.

Further, in the map error information obtaining system 100 according to the present invention, the center apparatus may be operative to promptly correct the map information in accordance with the map error information, and the map information storing means 2 may be operative to receive the map information from the center apparatus by way of telecommunication immediately when any correction is made in the map information to ensure that the map information storing means 2 constantly updates the map information. The map error information obtaining system 100 thus constructed can stimulate the operator of the position detecting apparatus 1 reporting the map error information especially while driving on an unknown road because of the fact that the operator can promptly verify whether or not his or her map error information is reflected in the latest map information at any time using the display means 5.

Though it has been described in the above that the center apparatus 9 comprises evaluation point managing means 12 for having stored therein the evaluation point, in the map error information obtaining system according to the present invention, the center apparatus 9 may comprise evaluation point transmitting means for transmitting the evaluation point calculated by the evaluation point calculating means 11 to the position detecting apparatus 1 by way of telecommunication, and the position detecting apparatus 1 may comprise evaluation point receiving means for receiving the evaluation point received from the center apparatus 9 and evaluation point storing means for storing therein the evaluation point thus received. The map error information obtaining system thus constructed can achieve the same effect as that of the aforementioned embodiment. In addition, the map error information obtaining system thus constructed can provide the operator with the incentive greater than the aforementioned embodiment because of the fact that the operator can immediately become aware of his or her evaluation point.

As will be seen from the foregoing description, it is to be understood that the present invention provides a map error information obtaining system and a map error information obtaining method, comprising a center apparatus including evaluation point calculating means for calculating an evaluation point on the basis of the map error information inputted by an operator, thereby providing the operator, who has transmitted the map error information, with rewards in accordance with the evaluation point, and accordingly promoting the collection of the map error information.

In addition, the present invention provides a map error information obtaining system and a map error information obtaining method comprising a position detecting apparatus including image obtaining means for taking a picture of and in the vicinity of the current position to obtain image data indicative of an actual condition of and in the vicinity of the current position to be outputted to the center apparatus, thereby eliminating the need of dispatching personnel to research the site where the error in the map information is reported and decreasing the number of man-hours required to verify whether or not the map data correction information is accurate.

What is claimed is:

1. A system for collecting map error information, comprising:
    a position detecting apparatus, the position detecting apparatus mounted on a movable object, the position detecting apparatus generating map error information indicative of an error in map information stored therein upon being different between the map information and a current position of the movable object; and
    a center apparatus, the center apparatus calculating an evaluation point on the basis of map error information generated by the position detecting apparatus, the center apparatus storing therein the evaluation point in association with the position detecting apparatus, the evaluation point in view of which a reward for an operator of said position detecting apparatus is determined in view of the evaluation point stored in the center apparatus.

2. A center apparatus for collecting map error information from a position detecting apparatus, comprising:
    managing means for calculating an evaluation point on the basis of the map error information; and
    means for storing therein the evaluation point in association with the position detecting apparatus; and wherein
    a reward for an operator of the position detecting apparatus is determined in view of the evaluation point stored in the managing means.

3. A method for collecting map error information, comprising:
    generating map error information indicative of an error in map information upon being different between the map information and a current position of a movable object;
    calculating an evaluation point on the basis of map error information generated by the position detecting apparatus; and
    storing the evaluation point in association with the position detecting apparatus, and wherein
    a reward for a reporter who reports generated map error information is determined in view of the stored evaluation point.

* * * * *